United States Patent [19]

Dingus

[11] Patent Number: 4,789,321
[45] Date of Patent: Dec. 6, 1988

[54] CARBON BLACK PELLETIZER

[76] Inventor: George W. Dingus, 1821 Mary Ellen St., Pampa, Tex. 79065

[21] Appl. No.: 167,904
[22] Filed: Mar. 14, 1988
[51] Int. Cl.$^4$ .............................................. B29C 67/02
[52] U.S. Cl. .................... 425/222; 425/209; 425/DIG. 230; 23/314; 264/117
[58] Field of Search ................ 23/314; 425/207, 208, 425/DIG. 230, 222, 209; 264/117; 366/275, 349

[56] References Cited
U.S. PATENT DOCUMENTS

| | | | |
|---|---|---|---|
| 3,160,395 | 12/1964 | Reising | 264/117 |
| 3,326,642 | 6/1967 | Ruble | 23/314 |
| 4,222,727 | 9/1980 | Adachi et al. | 425/222 |

Primary Examiner—Bernard Nozick
Attorney, Agent, or Firm—Donald R. Cassady

[57] ABSTRACT

Carbon black pelletizer comprising a pug-mill and rotor with at least one helix of pins attached to the rotor, the improvement which consists essentially inproviding a double wall cylindrical housing with an annulus therebetween. The inner wall being fabricated of a rigid metal grating, to the inside of which is bonded rubber or a similar resilient material, the annulus being supplied with a means to increase and/or decrease the volume therewithin thereby causing the resilient inner wall to flex removing from the inner wall the build up of black which forms during operation of the pelletizer. The improvement negates the need for alloy metals in the pelletizer housing, eliminates the carbon black build-up on the inner surface of the mill, and lessens the power requirements of the mill, the wear on the mill pins, and the tendency of the mill to discharge irregular, off-specification product.

4 Claims, 3 Drawing Sheets

CARBON BLACK PELLETIZER

BACKGROUND OF THE INVENTION

This invention relates to the art of wet-pelletizing carbon black. More particularly, this invention relates to an improvement in an apparats which is particularly adapted to carrying out the pelletizing process.

Carbon black is produced by the dissociation or cracking of hydrocarbons by the thermal, impingement, or furnace method. The product produced by any of the processes is characteristically an extremely light, finely-divided, fluffy, bulky material.

It has long been known that the apparent density of the black can be advantageously increased by conversion of the black to comparatively small, generally spherical, and relatively dense beads. Such beads or pellets are sufficiently stable so that they can be shipped and ultimately used in a dustless condition. The pellets are nontheless sufficiently friable that they can be satisfactorily broken-up in a typical compounding process.

A typical process for treating the carbon black to form the spheres or pellets is by agitating a mixture of the carbon black in a suitable wetting agent, as for example, water, in a stationary vessel whose configuration is advantageously an elongated cylinder. The agitating action is obtained by rotating within the cylindrical vessel an axially positioned shaft having a plurality of spaced pins radially extended therefrom. In such pin pelletizers the length of the individual pins is such to provide a clearance of from 4 to about 90 mm. between the inner surface of the cylinder and the tip of the pins. The pins are advantageously arranged in one or more helical flights.

A disadvantage of the previously described pug-mill pelletizers is the accelerated wear on the tip of the pin from the abrasive action of the carbon black which builds up on the tubular housing filling the space between the housing and the tip of the pins. Pins must be replaced when several have broken or when the clearance between the pin tip and the inner surface of the cylinder becomes sufficiently large from pin wear to permit a thick build-up of carbon black on the inner surface of the cylinder. Friction between the built-up cake of black and the pin tips necessitates the use of additional power, beyond that required to cause pellet formation, to rotate the shaft. Additionally, chunks of cake occasionally break away from the build-up of cake on the housing, momentarily imposing exceptionally heavy loads on the drive and causing power surges. One method to minimize the formation of accretions has been disclosed in U.S. Pat. No. 3,607,086. By the method of that patent, water at about the boiling point is circulated through a water jacket mounted on the cylindrical housing of the mill.

SUMMARY OF THE DISCLOSURE

This invention pertains to an improvement in the above described prior art pelletizer. More particularly this invention pertains to a pelletizer with a double wall cylindrical housing. Between the walls of the housing is an annulus adapted for being connected to a source of fluid to vary the volume of the annulus. The inner wall is fabricated of a rigid grating, to the inner surface of which is bonded a tough, elastomeric material, as for example, sheet rubber. The annulus between the outer wall and the inner wall is adapted to be filled to varying volumes or pressures to cause flexing of the inner wall.

The flexing of the inner wall will prevent the build-up of the hard, cohesive cake of carbon black that typically builds up on the housing of prior art pelletizers. The flexing of the inner wall of the housing will also remove any carbon black that may have built-up prior to the inner wall having been flexed by pressure changes in the annulus.

Typically the inner wall is fabricated by bonding a continuous sheet of an abrasion resistant rubber or synthetic rubber or similar elastic material to a rigid perforated metal backing or a metal grating. The grating may be flattened expanded metal or other rigid metal grating. Because the metal of the grating does not contact the product, the grating need not be fabricated of corrosion resistant materials.

During operation of the mill, pressure within the annulus is varied sufficiently to cause flexing of the inner wall thereby breaking off the deposited carbon black into the main stream of the pellets and renewing the surface of the inner wall preventing additional build-up of black.

DETAILED DESCRIPTION OF THE INVENTION

This invention will be further described and illustrated by reference to the accompanying drawings which will illustrate the preferred embodiments thereof.

Figure 1:
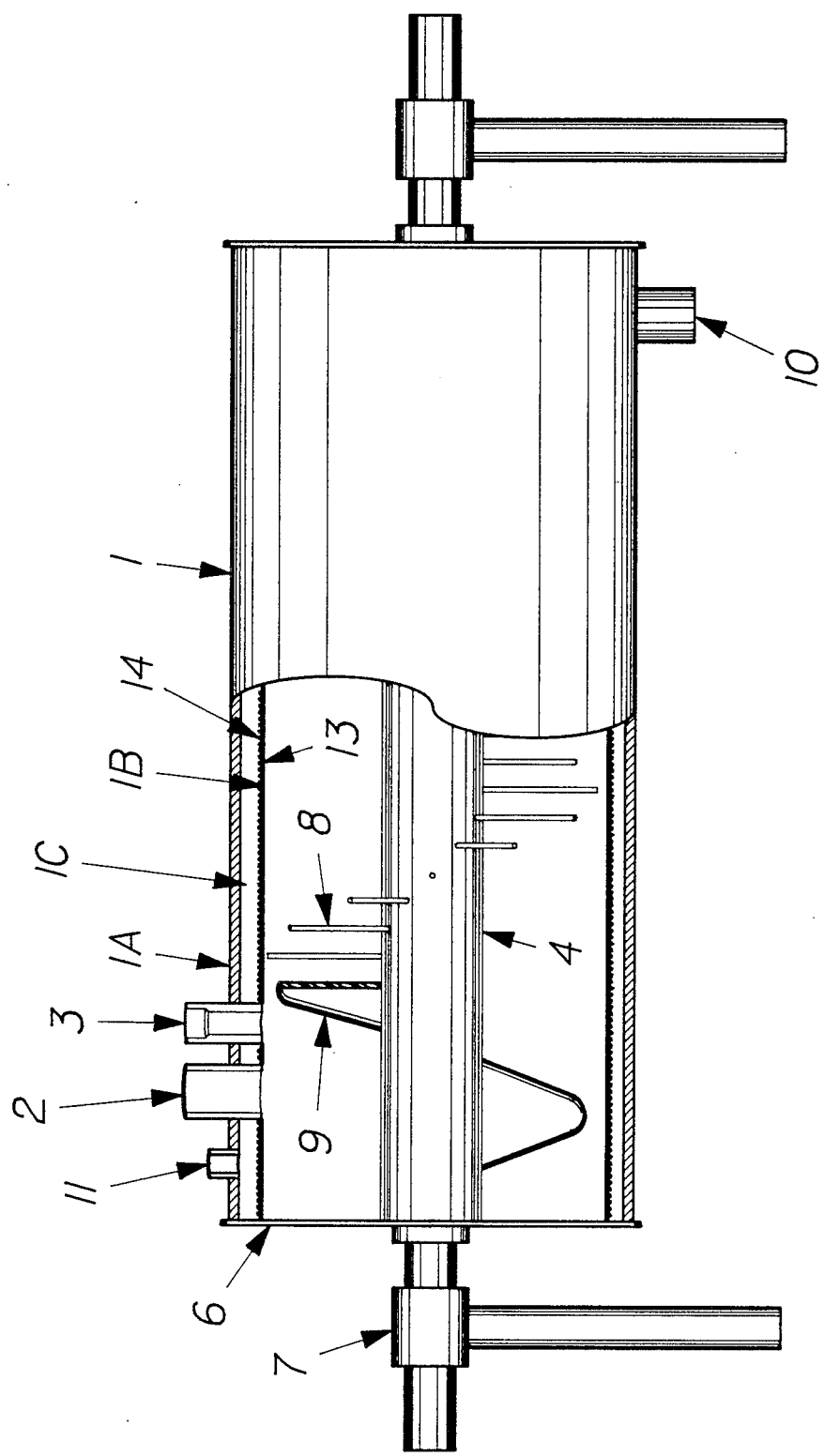
FIG. 1 is a cutaway view of a wet pelletizer showing the rotor and pins customarily found in such pelletizer and showing, generally, the improvement of this invention.
Figure 2:
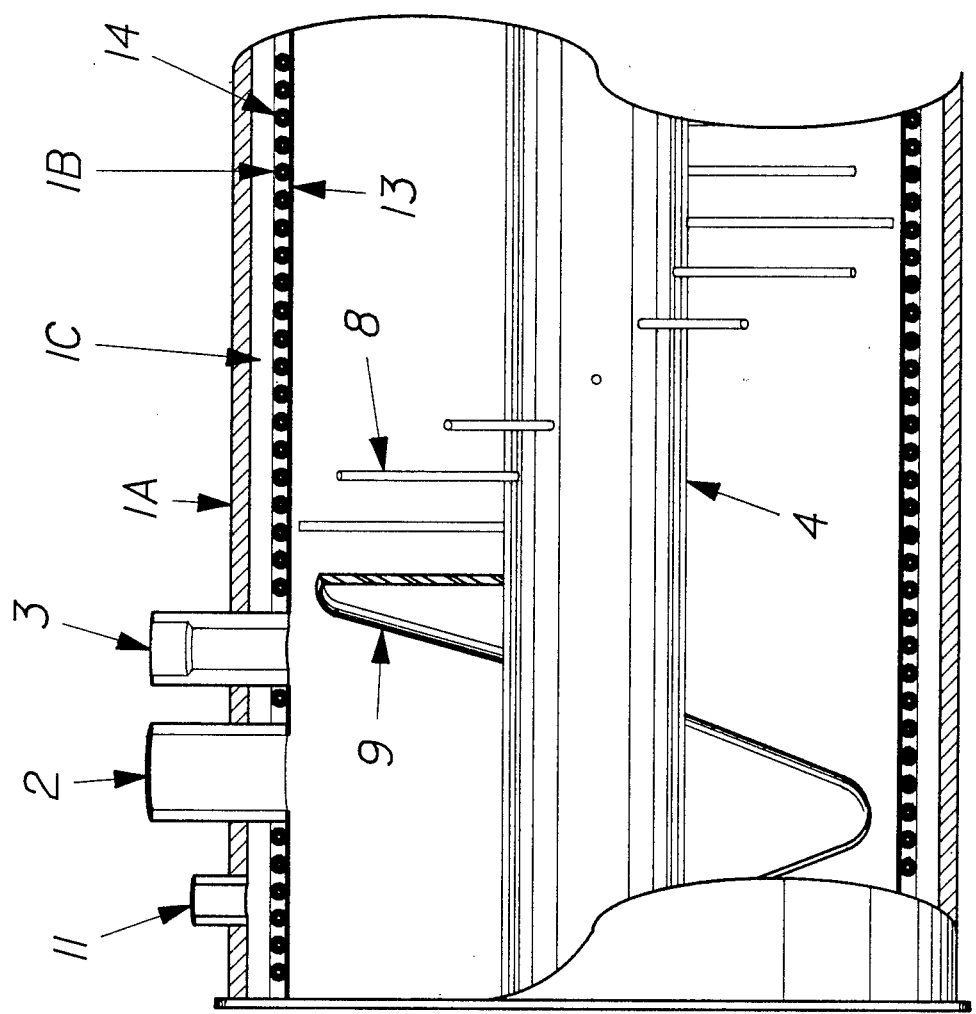
FIG. 2 is a detailed view of a first embodiment of the invention.

Referring now to the drawings, there is shown a cylindrical pelletizer housing 1 including a first cylindrical wall 1A and a second cylindrical wall 1B of length equal to the first cylindrical wall and symetrically placed therewithin causing an annulus 1C to occur therebetween and a pair of housing closure end plates 6 attached in sealed relationship to each cylindrical wall at each end, an inlet tube 2 through both cylindrical walls at one end for the addition of the fluffy carbon black and, optionally, an inlet tube 3 on the same end for addition of the pelletizing agent, i.e. water, and a nipple 11 for the control of the volume and pressure of the annulus through the first cylindrical wall 1A into the annulus 1C. Although two inlet tubes are shown, it is to be considered within the scope of this invention that one inlet tube may be provided with the carbon black being pre-mixed with the pelletizing agent prior to use or that the carbon black and pelletizing agent are added concurrently through a common opening. At the opposite end portion of the pelletizer housing 1 is an outlet tube 10 through both the first wall and the second wall to discharge the pellets of black to a dryer.

The first or outer cylindrical wall 1A is typically mounted horizontally and can be fabricated of mild steel tubing, or rolled stock. Preferably, the first cylindrical wall 1A and housing closure end plates 6 can be fabricated of sheet metal having a gauge thickness of at least about 4 mm. Corrosion resistant metals are not required, although, of course, they may be used to fabricate the wall 1A and end plates 6.

The second or inner cylindrical wall 1B is fabricated by bonding a flexible material 13, as for example, a natural or synthetic rubber material which has been compounded to resist abrasion and scuffing to the inner surface of a rigid perforated metal backing or metal grating 14. For example, the second cylindrical wall 1B can be fabricated out of an expanded sheet metal base and an impervious overlay molded thereto. Such an overlay can be made of about one-fourth inch or similar weight resilient natural or synthetic rubber or a similar flexible synthetic polymeric material. Typically the rigid metal grating will be of 12 gauge or heavier sheet metal and have at least about 50% open spacing to provide sufficient movement of the flexible overlay during operation to remove the caked carbon black. Preferably the grating will consist of 60% or more open area.

The annulus 1C between the outer cylindrical wall 1A and the inner cylindrical wall 1B may be from about 2 to about 4 cm. preferably about 3 cm. and may contain circumferential ribs, attached to the metal component of wall 1B for mechanical reinforcement. Such ribs would be perforated to maintain the continuity of annulus space.

The housing 1 can have a diameter of from about 25 centimeters to about 1 meter and a length of from about 1.5 meters to about 4 meters between end plates 6.

In a first embodiment, each of the housing closure end plates 6 can be made of the same or similar material to the first or outer cylindrical wall 1A. In this embodiment, the end plates must be attached in sealed relationship to each of the cylindrical walls 1A and 1B.

Figure 3:
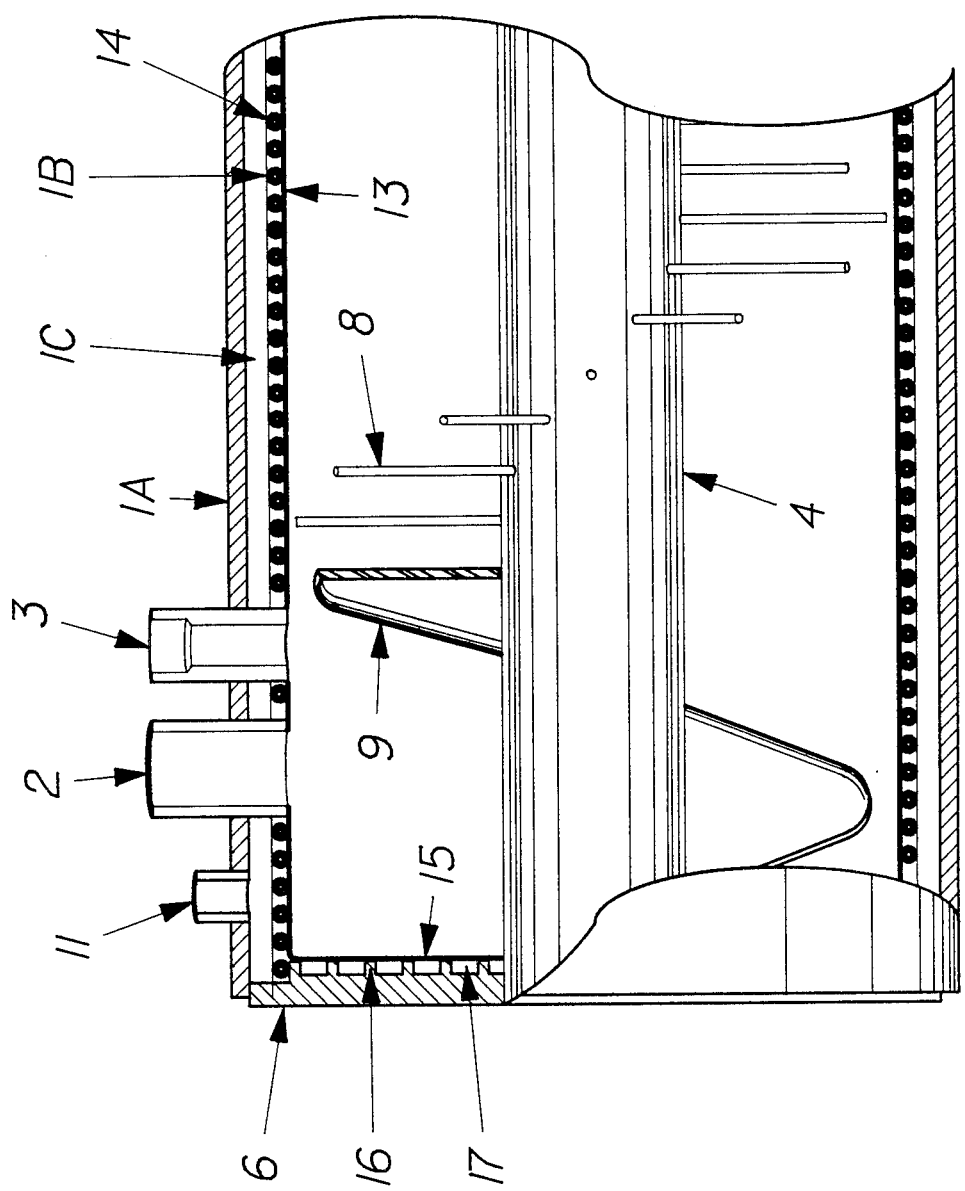
FIG. 3 is a detailed view of a second embodiment of the invention.

In a second embodiment, as shown in FIG. 3, each of the end plates 6 is fabricated from heavy carbon steel or a similar material for structural strength milled with lands 16 and grooves 17 on the surface of each end plate facing the inside of the housing 1, with flexible material 15 bonded to the lands 16; the groves 17 communicating with the annulus 1C. In this embodiment, the end plate is attached in sealed relationship to the outer cylindrical wall 1A and the flexible material 15 is attached in sealed relationship to the flexible material 13 of the inner cylindrical wall 1B.

A shaft 4 is rotatably journalled within the mill housing 1 with the ends thereof mounted to a drive shaft, not shown, or similar drive mechanism to cause rotation of the shaft at an appropriate angular velocity. The rotatable shaft 4 is typically of from about 5 cm. to about 40 cm. in diameter, ideally comprising about 25% to about 35% of the diameter of the housing, with the ends of the shaft 4 extending through packing glands (not shown) affixed to the housing closure end plates 6 and supported outside of the housing upon bearings 7.

Within the housing at least a portion of the shaft 4 is provided with a plurality of radially mounted pins 8. The pins are rigidly mounted at uniformly spaced distances, both longitudinally and angularly so as to form one or more helical rows thereupon. The length of the individual pins is such as to provide a clearance of from about 4 mm. to about 40 mm. between the inner surface of the cylinder and the tip of the pins. The pins can be fabricated in one piece or in two or more pieces connected end-to-end. Multipart pins have the advantage that only a portion of the pin need be replaced to repair broken or worn pins. Multipart pins also allow the pin components to be fabricated from materials of differing strengths and abrasion resistance.

Alternatively, at least a portion of the shaft, ideally situated at the inlet end of the housing, can be provided with an auger element 9 to facilitate feeding of the pin section of the mill with black. The auger element 9 comprises typically about 15% to about 20% of the length of the housing and has a 60 cm. pitch.

During operation, the rotor is driven at from about 250 to about 800 revolutions per minute requiring a power source of from about 30 to about 200 horsepower. The carbon black and pelletizing agent or the pre-mixed carbon black-pelletizing agent mixture is measured into the inlet tube. Rotation of the rotor and the pins attached thereto causes extreme agitation of the carbon black and a portion thereof is typically thrown against the wall of the housing until it builds up to the tip of the pin. Continued agitation causes pellet formation.

According to the present invention, during pellet formation, the carbon build-up on the inner cylindrical wall 1B of the pug mill is removed at regular intervals by the flexing of the inner surface 13 of the second cylindrical wall 1B caused by varying the pressure within the annulus 1C. Pressure within the annulus 1C. and therefore, the volume of the annulus 1C is varied by the addition and withdrawal of a fluid through nipple 11 from a source of fluid (not shown). I have found that both liquids, as for example water, and gases, as for example air, can act as appropriate fluids for varying the volume of the annulus 1C. The varying of the volume within the annulus 1C will act to clear the carbon buildup from the surface of the second cylindrical wall 1B of the pug-mill during operation. In the second embodiment described above, as shown in FIG. 3, where the end plate grooves are in communication with the annulus, the flexible material bonded to the lands will also flex during pressure changes in the annulus clearing carbon black from the end plates.

To accomplish this variance of the volume of the annulus 1C in the most economical manner, I have found that the pressure within the annulus 1C is preferably varied from ambient atmospheric pressure to a pressure below ambient atmospheric pressure in a rhythmic, cyclic pattern with each cycle being of the order of from several seconds to one or more minutes.

I claim:

1. A carbon black wet-mill pelletizer which comprises:
   a horizontally mounted cylindrical housing consisting essentially of
   a first or outer cylindrical wall,
   a second or inner cylindrical wall spaced apart from and within the first cylindrical wall forming an annulus therebetween, and
   a housing closure end plate on each end attached in sealed relationship to the cylindrical walls;
   one or two inlet tubes at one end of the cylindrical walls extending through both cylindrical walls,
   an outlet tube extending through both cylindrical walls on the opposite end, and
   a nipple extending through the outer cylindrical wall and connecting with the annulus;
   a rotor rotatably mounted in the housing, the ends extending through the housing closure end plates,
   a rotor drive means, and
   a plurality of pins rigidly mounted radially at uniformly spaced distances, both longitudinally and angularly, on the rotor to form one or more helical flights;
   wherein the inner cylindrical housing is fabricated of a flexible material bonded to a rigid metal grating.

2. The pelletizer of claim 1 wherein there is one inlet tube on the housing.

3. The pelletizer of claim 1 wherein there are two inlet tubes on the housing.

4. The pelletizer of claim 1 wherein each of the housing closure end plates contains lands and grooves on the surface of the plate facing the inside of the housing, and a flexible material bonded to the lands; wherein the grooves are in communication with the annulus.

* * * * *